United States Patent
Haupt et al.

(10) Patent No.: US 8,558,687 B2
(45) Date of Patent: *Oct. 15, 2013

(54) REMOTE LOCATION MONITORING

(75) Inventors: Rolf Haupt, Chaiwan (HK); Allan McCormick, La Crescent, MN (US)

(73) Assignee: La Crosse Technology Ltd., La Crosse, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/439,152

(22) Filed: Apr. 4, 2012

(65) Prior Publication Data

US 2012/0188080 A1  Jul. 26, 2012

Related U.S. Application Data

(63) Continuation of application No. 12/349,231, filed on Jan. 6, 2009, now Pat. No. 8,154,398, which is a continuation-in-part of application No. 12/057,761, filed on Mar. 28, 2008, now Pat. No. 8,339,901.

(60) Provisional application No. 61/019,299, filed on Jan. 7, 2008, provisional application No. 60/981,862, filed on Oct. 23, 2007, provisional application No. 60/982,096, filed on Oct. 23, 2007, provisional application No. 60/982,137, filed on Oct. 23, 2007.

(51) Int. Cl.
*G08B 29/00* (2006.01)

(52) U.S. Cl.
USPC ............................. 340/506; 340/10.1; 702/3

(58) Field of Classification Search
USPC .......... 340/506, 10.1–10.3; 368/21, 47; 702/3
See application file for complete search history.

(56) References Cited

U.S. PATENT DOCUMENTS

| | | | |
|---|---|---|---|
| 6,076,044 A | 6/2000 | Brown | |
| 6,678,215 B1 | 1/2004 | Treyz | |
| 6,970,924 B1 | 11/2005 | Chu et al. | |
| 7,633,378 B2 | 12/2009 | Rodgers | |
| 8,154,398 B2 * | 4/2012 | Rolf et al. | 340/506 |
| 2002/0012290 A1 | 1/2002 | Shinagawa | |
| 2003/0189876 A1 | 10/2003 | Chan | |
| 2004/0249568 A1 | 12/2004 | Endo et al. | |
| 2005/0108213 A1 | 5/2005 | Riise | |
| 2006/0095210 A1 | 5/2006 | Chan | |

OTHER PUBLICATIONS

PCT/US2008/080953 Notification of Transmittal of the International Search Report and the Written Opinion of the International Searching Authority, or the Declaration mailed Dec. 29, 2008.

* cited by examiner

*Primary Examiner* — John A Tweel, Jr.
(74) *Attorney, Agent, or Firm* — Banner & Witcoff, Ltd.

(57) ABSTRACT

A remote location monitoring system, for example, a home monitoring or weather monitoring system may include one or more sensors and/or receivers at a remote location such as a residence or business to be monitored. The sensors and receivers may communicate with a central server via a gateway device, and may be controlled by users locally or remotely via the server. Users may register to receive remote notifications of weather events and other home monitoring events. Users may also access remotely sensors and receivers to configure alerts, notifications, and automatic responses for the devices and integrated appliances at the remote location.

20 Claims, 16 Drawing Sheets

REMOTE LOCATION MONITORING

RELATED APPLICATION INFORMATION

This application is a continuation U.S. application Ser. No. 12/349,231 filed Jan. 6, 2009 entitled "Remote Location Monitoring," to issue on Apr. 10, 2012 as U.S. Pat. No. 8,154,398, which is a continuation-in-part of U.S. application Ser. No. 12/057,761, entitled "Display Station," filed on Mar. 28, 2008, which claims priority to U.S. Provisional Application 60/982,137, entitled "Method of Transmitting, Receiving and Forwarding Data in a Low Power Network System," to Allan McCormick and Rolf Haupt, filed on Oct. 23, 2007, U.S. Provisional Application 60/982,096, entitled "Method of Transmitting, Receiving and Displaying/Playing Data such as Internet Radio Time, and Music on a Network System," to Allan McCormick and Rolf Haupt, filed on Oct. 23, 2007, U.S. Provisional Application 60/981,862, entitled "Method and Apparatus of Transmitting, Receiving, Displaying and Playing Weather Data," to Allan McCormick and Rolf Haupt, filed on Oct. 23, 2007, and U.S. Provisional Application 61/019,299, entitled "Method and Apparatus of Transmitting, Receiving, Displaying and Playing Weather Data," to Rolf Haupt and Allan McCormick, filed on Jan. 7, 2008, all of which are herein incorporated by reference in their entirety.

FIELD OF THE INVENTION

Aspects of the disclosure relate to remote location monitoring, for example, home monitoring and weather monitoring. More specifically, aspects of the invention relate to receiving and processing communications from detection devices and sensors at remote locations in order to inform users of the conditions and events occurring at the remote locations.

BACKGROUND

A home weather station with an exterior sensor may include external measurement mechanisms for the measuring or recording weather data in the exterior ambient area of a building. By means of a transmission mechanism which is combined with a measurement mechanism, the weather data is transmitted into the building and received by an internal receiving mechanism. The weather data transmission uses a radio signal in an appropriate data format for the receiving mechanism, which is an element of the home weather station located inside the building. The weather station may comprise a display mechanism combined with the receiving mechanism for the optical reproduction and display of the weather data within the building.

For example, a known weather station from the company Reinhardt Systems and Messelectronic GmbH, Bergstr. 33, 86911 Diessen-Obermiihlhausen, Germany, has the product name "MWS 5 W". The unit measures temperature, relative humidity, barometric air pressure, wind speed and wind direction and transfers this data as serial ASCII-data to a connected Laptop or PC or stores the data internally in a data logger memory. The weather station is mounted on a 1" water pipe or on a tripod. With the optional GPS-module, the time axis data in the data logger can be synchronized to the exact time, height, and geographical position. The memory capacity is 12 days if the data is recorded in 10 minutes intervals. Another system, described in DE 198 01 688 A1, includes a radio signal converter that receives a timing signal from a timing signal sender and sends an appropriate signal at another frequency to a timer which is located within a closed building. The frequency is selected such that this signal as opposed to the original timing signal can penetrate the building so that the timer can always be synchronized. Such an arrangement has multiple individual components. However, such a system would not function properly in the many places on the planet where there is no receiving for a timing signal that can be received outside a building. Furthermore, when a timing signal can be received, a device would be required that can be adjusted to individual specific features of the timing signal in a specific momentary location area.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In one aspect of the invention, methods, systems, and devices are provided for remote location monitoring, including detecting and transmitting detection data from one or more detection devices at one or more remote locations to a server via a computer network. The detection data may correspond to detection readings from the various detector devices, for example, temperature sensors, wind sensors, humidity sensors, pressure sensors, rain sensors, motion sensors, alarm sensors, and other weather and home monitoring sensors. After receiving the detection data, the server may identify a detector type associated with the data and retrieve a set of detection parameters for notifying users of the data detected at the remote locations. Users may register to receive notifications (e.g., pages, text messages, emails) upon detection of certain conditions (e.g., weather conditions, alarm conditions), at remote locations. For example, a user may register to receive a notification by email every time the temperature sensor in that user's back yard drops below a specified temperature (e.g., 20° F.). As another example, a user may request a text message or phone call to the user's work phone or text message to the user's mobile phone when a burglar alarm or smoke detector sounds in the user's home.

According to an additional aspect, the server may be configured to display detection data from multiple different detectors at different remote locations on a single web site interface. For example, all weather updates (e.g., temperature, wind, rain, humidity) may be logged and displayed as overlays on a digital map, presenting users with may different data points to allow for more detailed views and predictions of the coming weather conditions. According to yet another aspect, users may select individual readings or data points on such a map to view for detailed information about the location, review previous readings, and send messages to the registered user(s) associated with the location.

According to another aspect, remote location sensors and detector devices may relate to home monitoring, such as detectors for smoke detectors, fire alarms, burglar alarms, power consumption monitors, motion detectors, standing water monitors, and other home monitoring detection devices. In certain embodiments, an audible analog alarm signal may be detected by an audio detector at a remote location. The analog alarm signal may be converted to a digital signal and compared to one or more predetermined digital alarm pattern signals. Upon determining that the audible signal corresponds to known alarm signal (e.g., a smoke alarm signal), a notification may be transmitted to a user registered to receive notifications for that location.

BRIEF DESCRIPTION OF THE DRAWINGS

Figure 1:
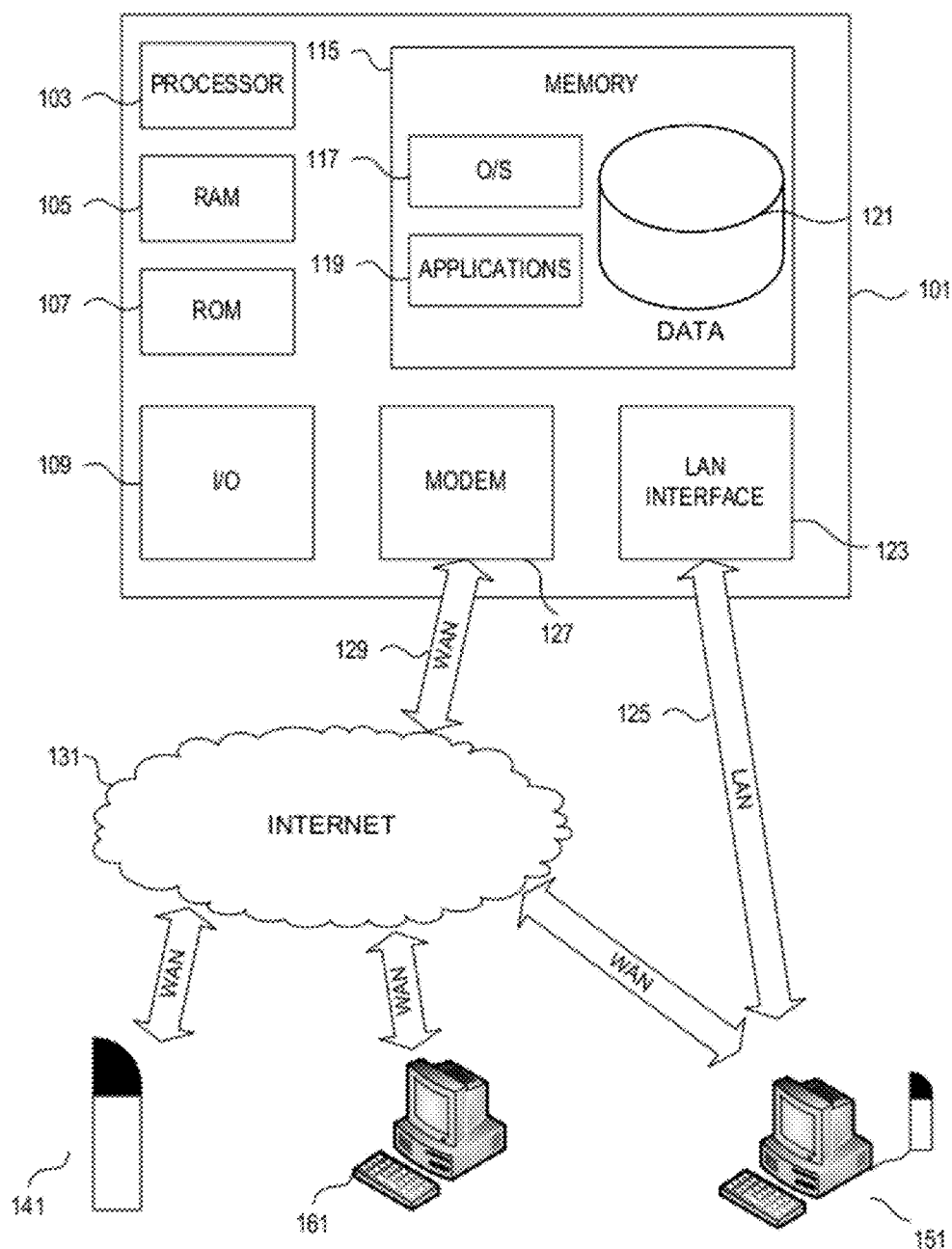
Figure 2:
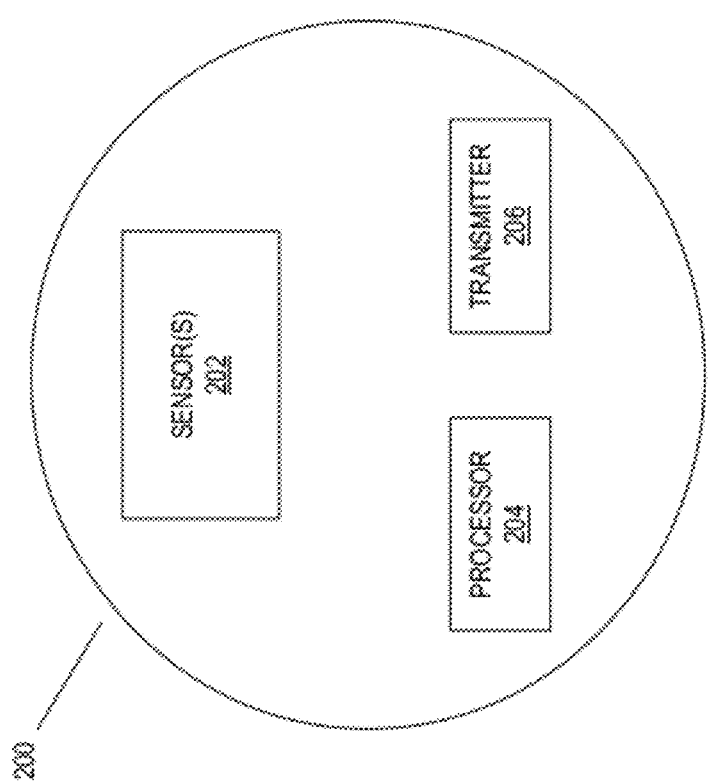
Figure 3A:
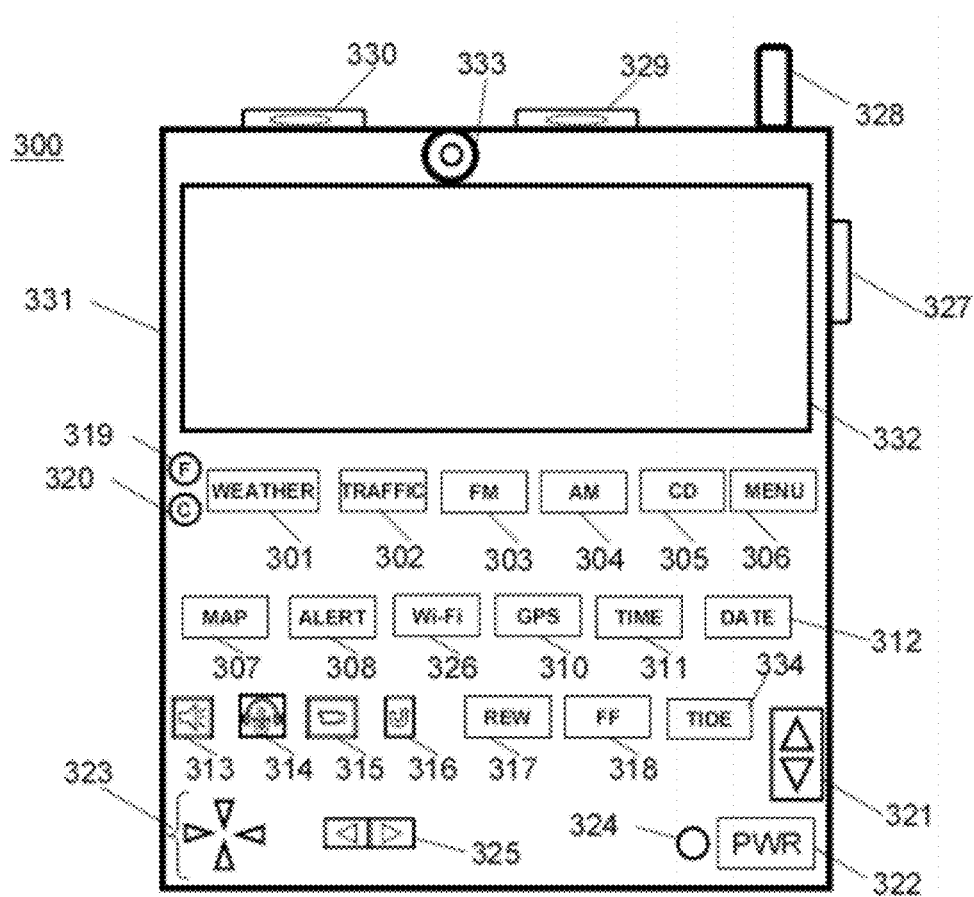
Figure 3B:
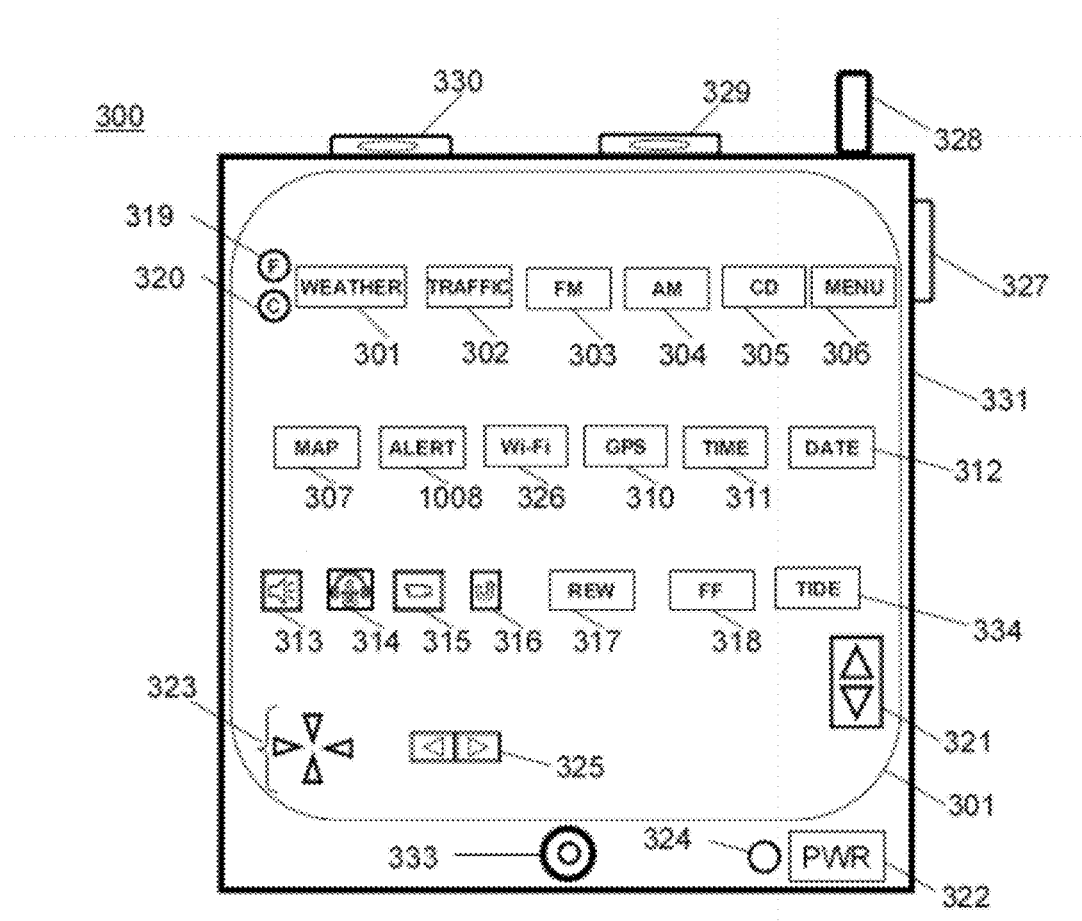
Figure 3C:
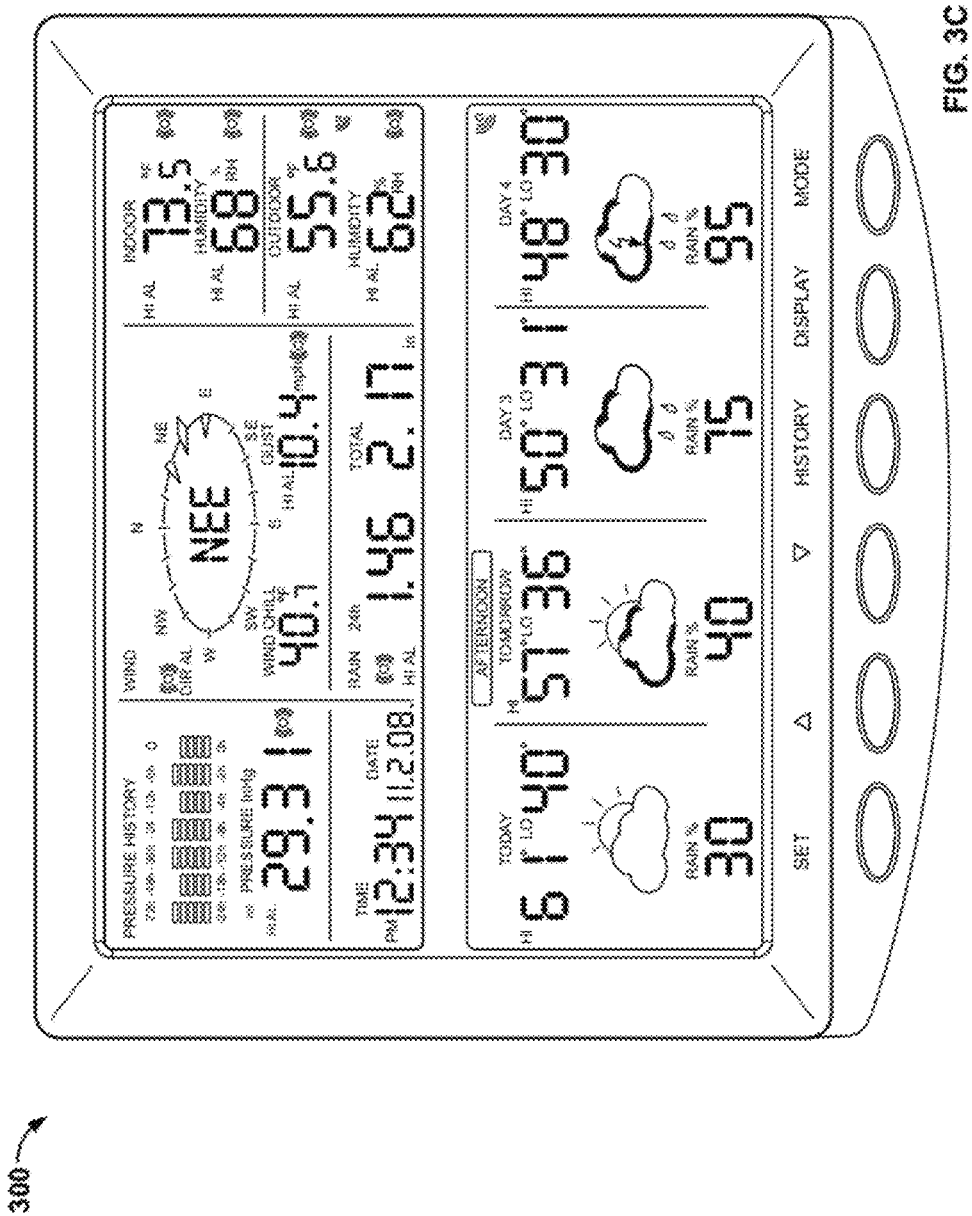
Figure 4:
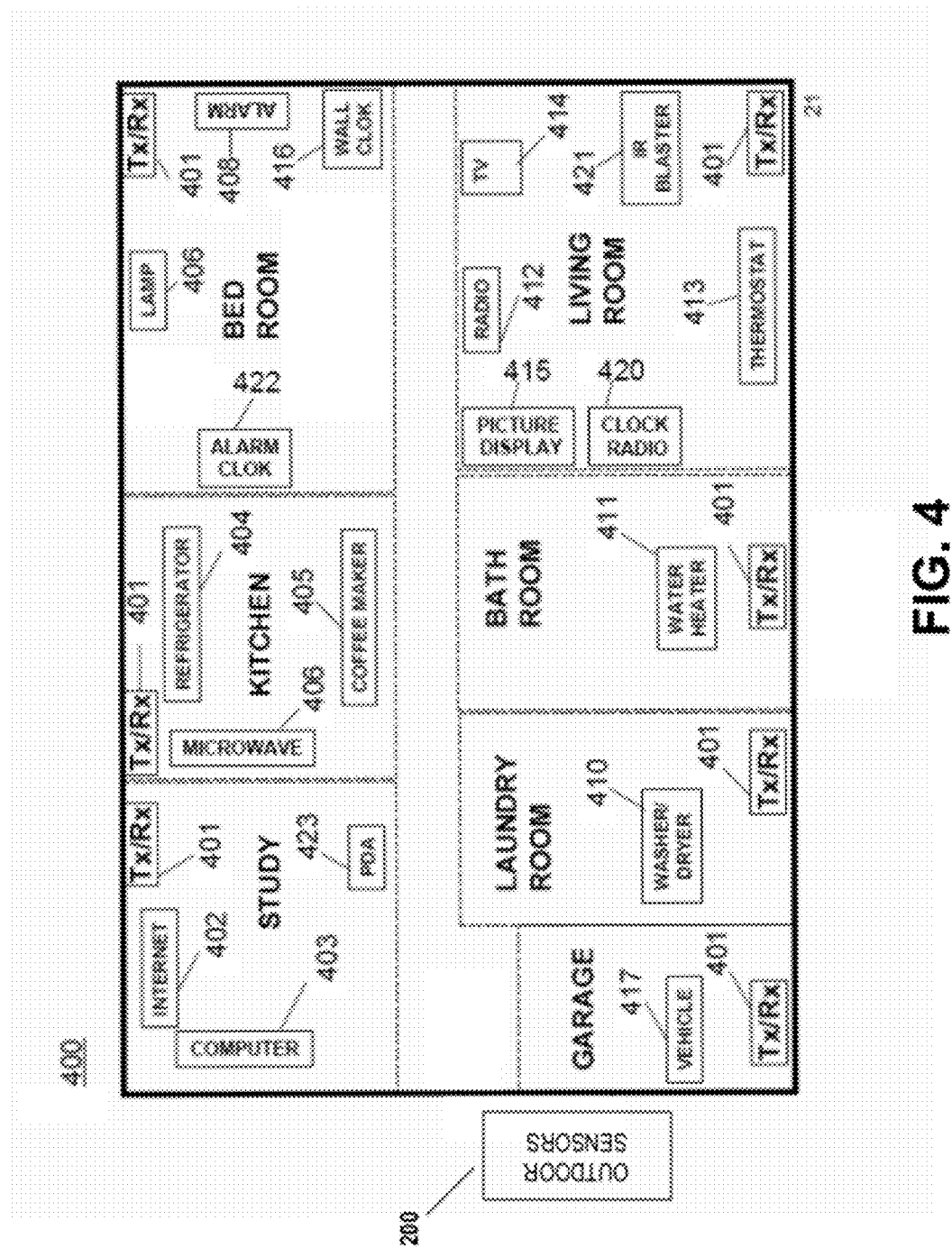
Figure 5:
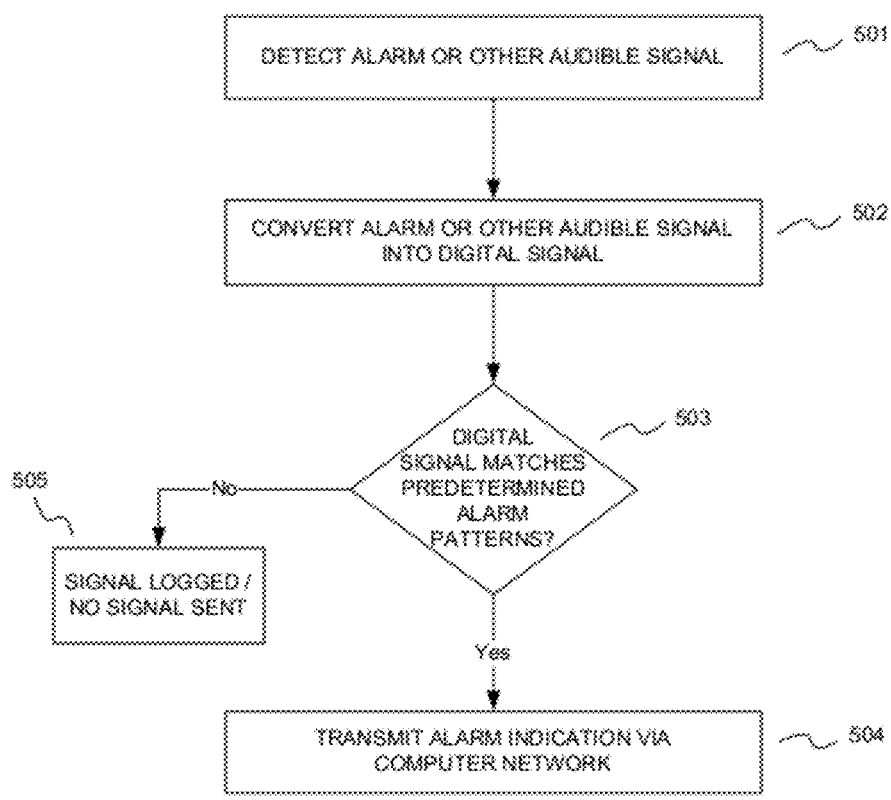
Figure 6:
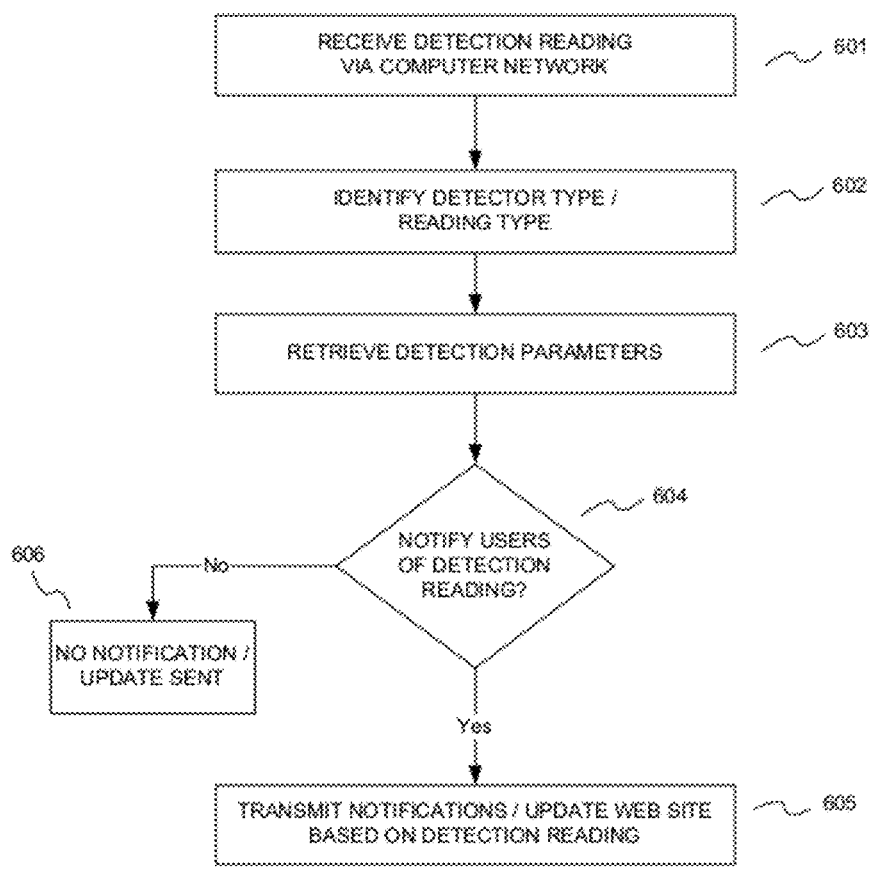
Figure 7:
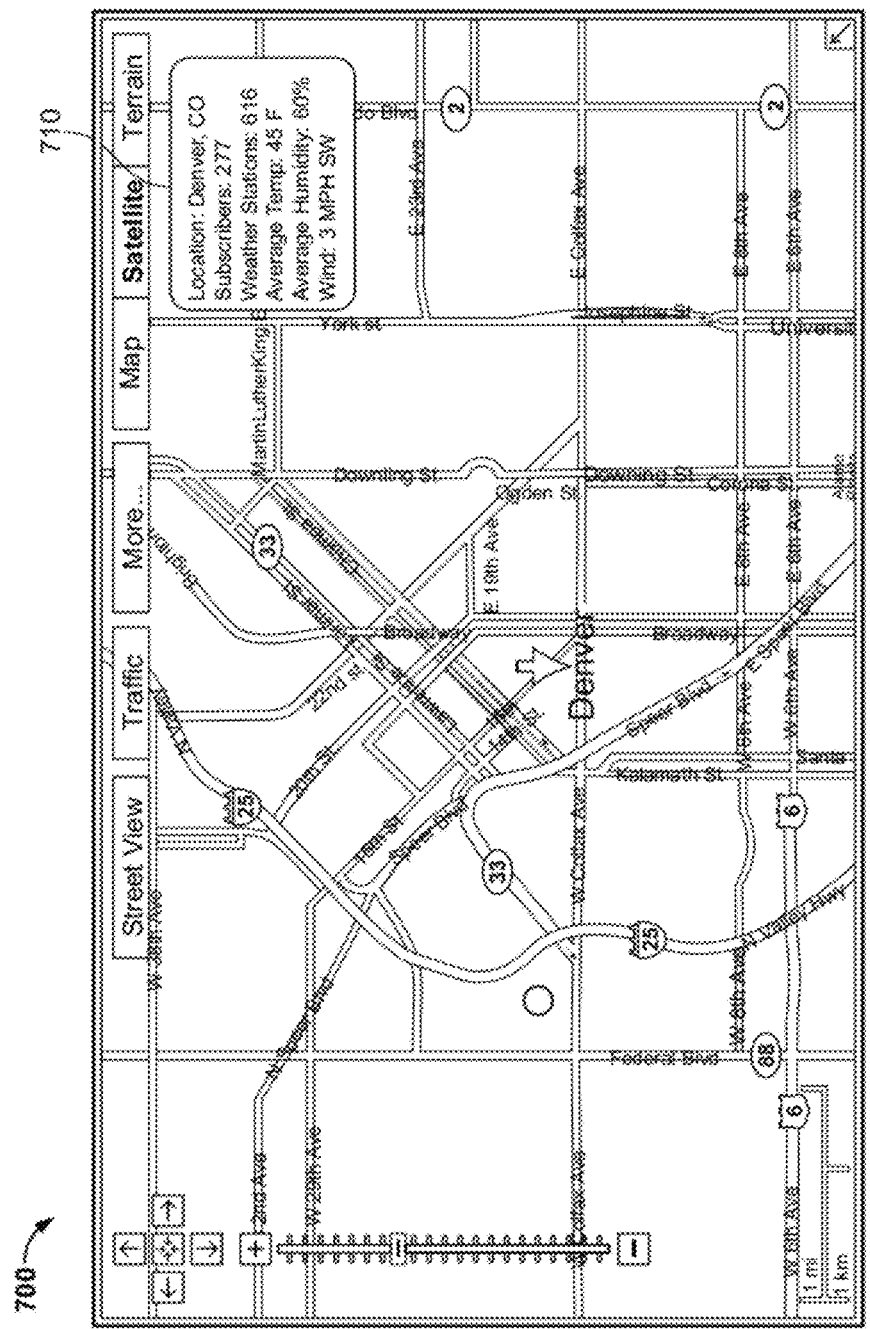
Figure 8:
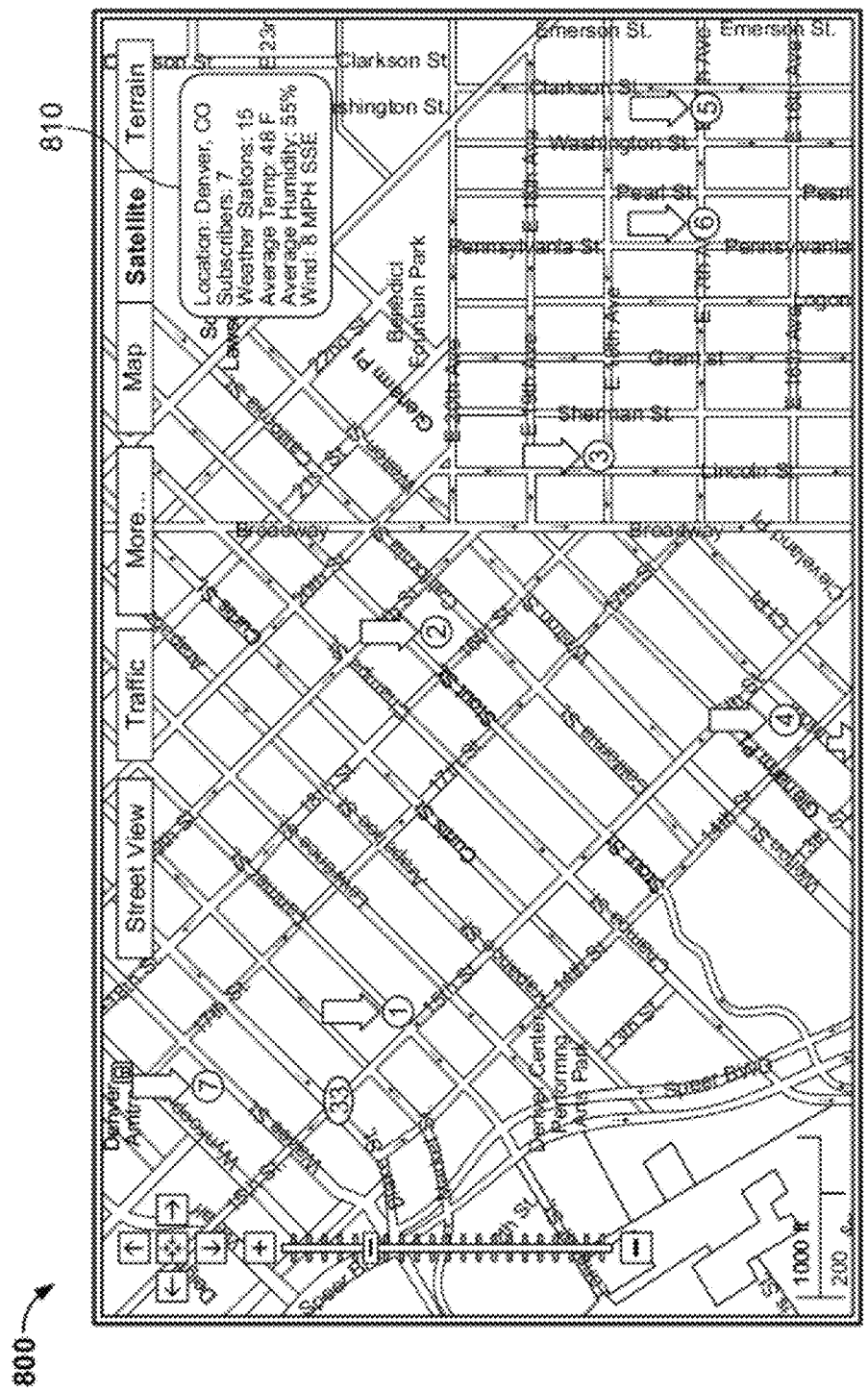
Figure 9:
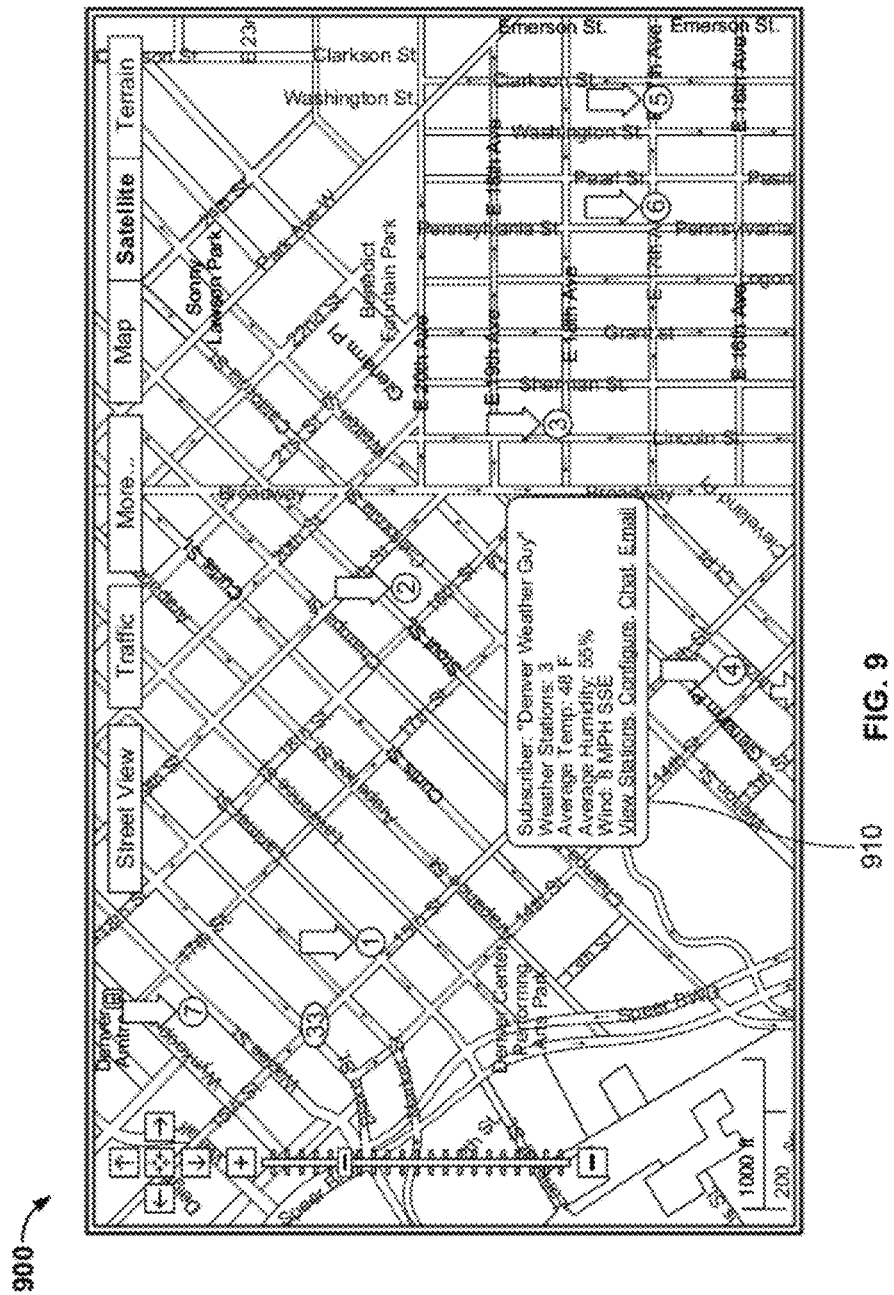
Figure 10:
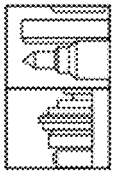
Figure 11:
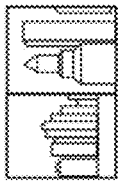
Figure 12:
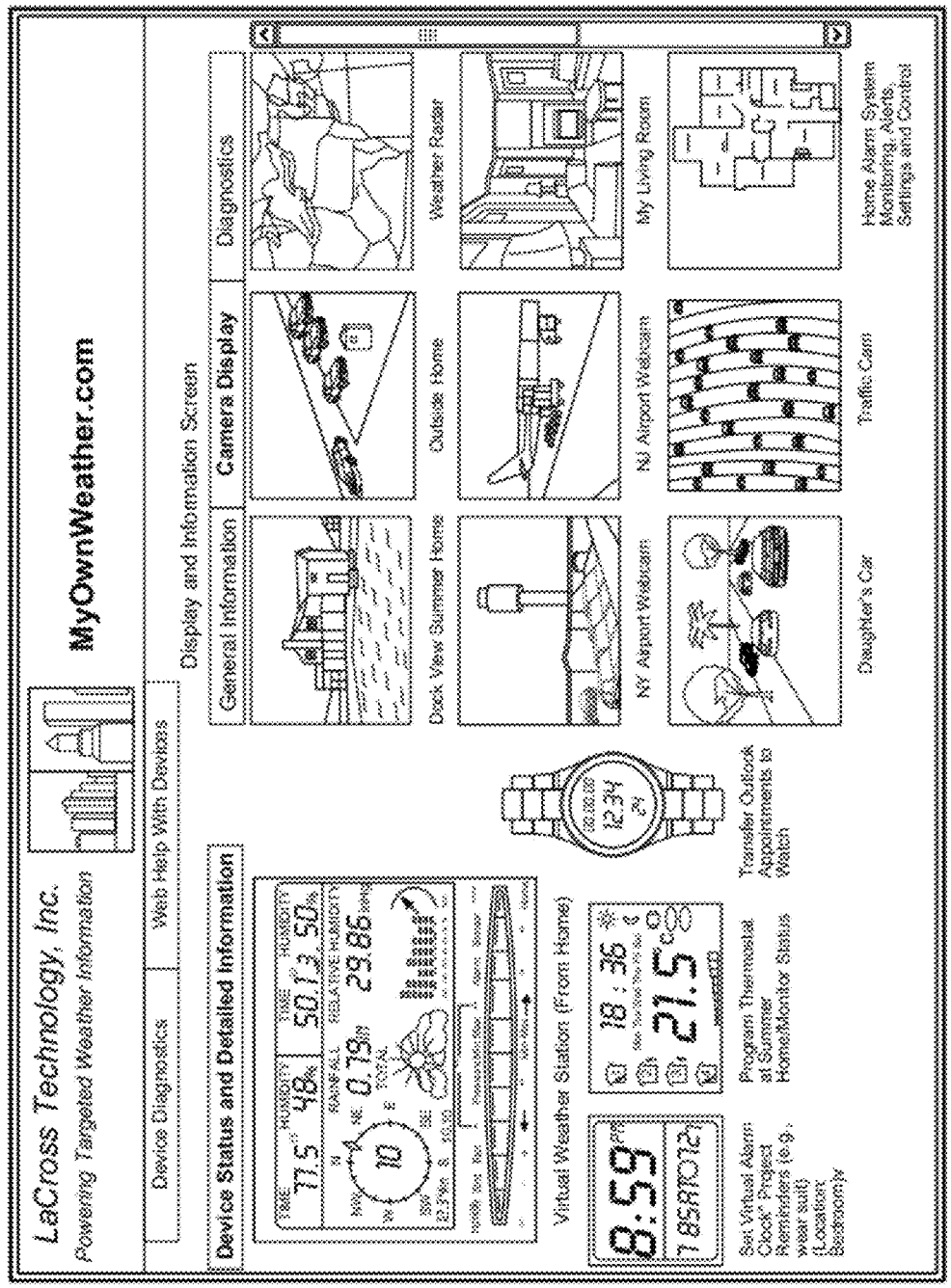
Figure 13:
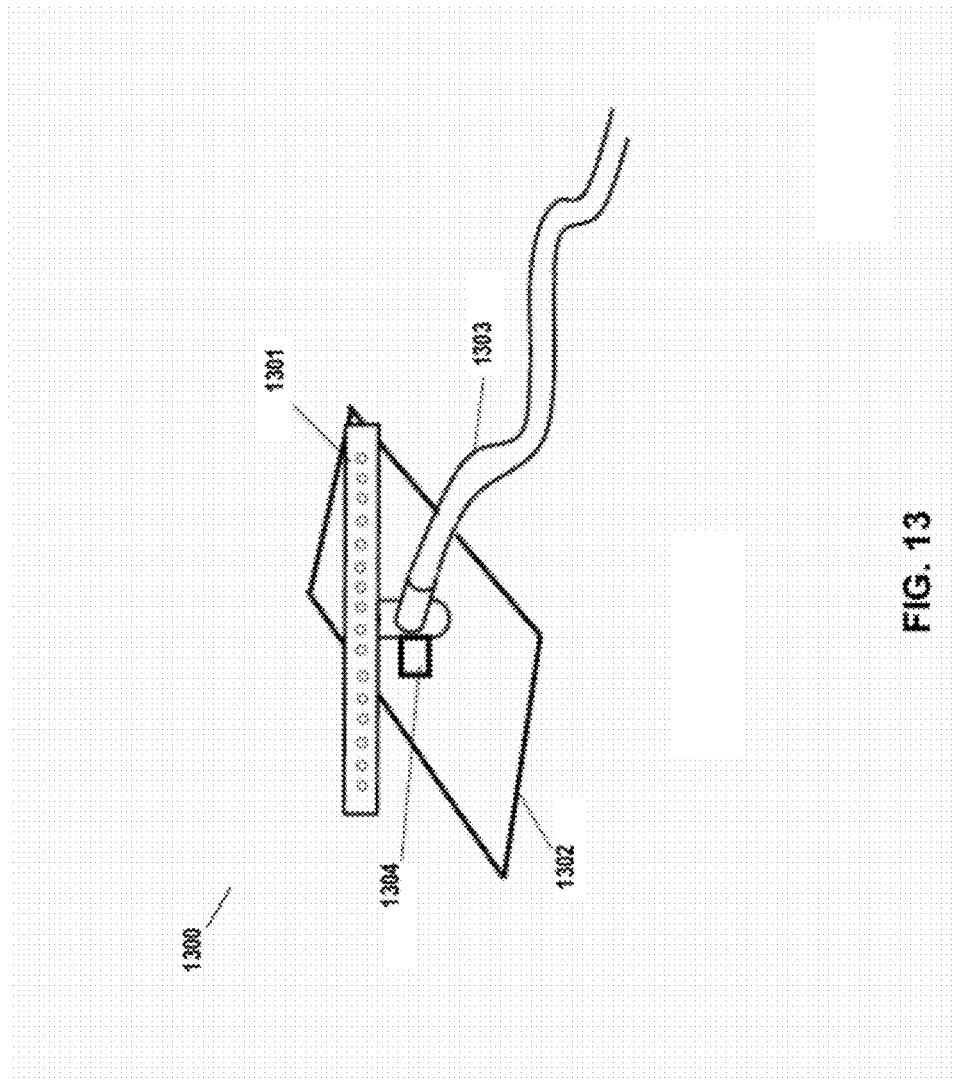
Figure 14:
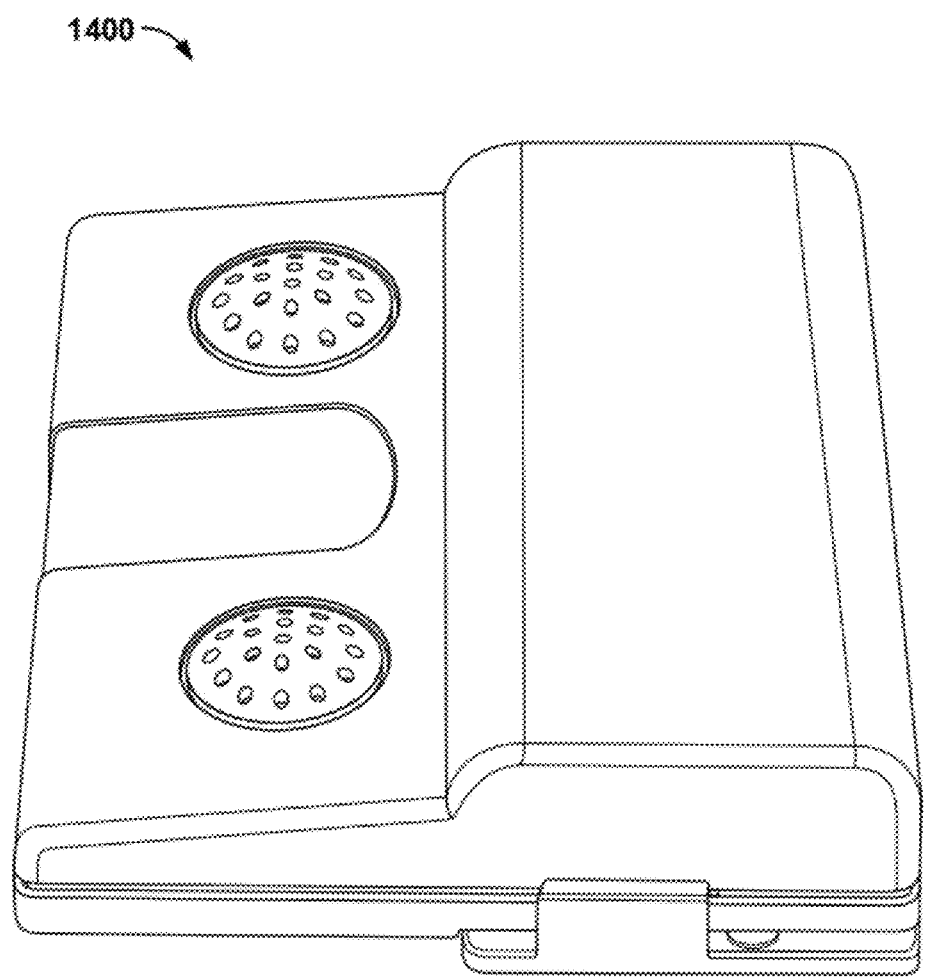

Having thus described the invention in general terms, reference will now be made to the accompanying drawings, which are not necessarily drawn to scale, and wherein:

FIG. 1 is a block diagram illustrating a computing device and network, in accordance with aspects of the present invention;

FIG. 2 is an illustrative detector system including one or more sensors, in accordance with aspects of the present invention;

FIGS. 3a-3c show illustrative receiver systems including user interface buttons and display screens, in accordance with aspects of the present invention;

FIG. 4 shows an illustrative remote location including receivers and sensors integrated into various appliances, in accordance with aspects of the present invention;

FIG. 5 is a flow diagram showing illustrative steps for providing an alarm indication based on a detection of an audible alarm at a remote location, in accordance with aspects of the present invention;

FIG. 6 is a flow diagram showing illustrative steps for notifying users based on a detection reading at a remote location, in accordance with aspects of the present invention;

FIGS. 7-9 are images depicting illustrative user interfaces based on underlying mapping software and features, and data based on the geographic region selected and/or a selected subscriber, in accordance with aspects of the present invention;

FIGS. 10-12 are images showing illustrative user interfaces provided by a server for viewing, configuring, and controlling devices at a remote location, in accordance with aspects of the present invention;

FIG. 13 is an illustrative appliance configurable to be controlled by a receiver via a wireless module, in accordance with aspects of the present invention; and FIG. 14 is an illustrative smoke detector detector device configurable to provide an alarm indication based on a detection of an audible alarm at a remote location, in accordance with aspects of the present invention.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates a block diagram of a generic computing device 101 (e.g., a computer server) that may be used according to an illustrative embodiment of the invention. The computer server 101 may have a processor 103 for controlling overall operation of the server and its associated components, including RAM 105, ROM 107, input/output module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of account information and account holder information for the entire business, allowing interoperability between different elements of the business residing at different physical locations.

According to certain aspects, the server 101 may operate in a networked environment supporting connections to one or more remote devices, such as gateway device 141, computer terminal 161, and gateway/computer combination 151. Gateway 141 is an illustrative home based network interface that may be used as an alternative device (rather than home or mobile computing devices) to communicate with the server 101 from remote locations. The gateway 141, computer 161, or combination terminal 151 may be coupled to a plurality of detecting devices and/or receiving devices via a suitable interface. For instance, the illustrative gateway device 141 may be capable of communicating with a large number of wireless devices (up to 120 in certain examples) in a weather station network system or home monitoring network system, at great distances designed to encompass an entire house and yard of a residence or a business environment (e.g., up to 300 feet in certain embodiments). The gateway 141 in this example may be connected to an Internet router via a LAN cable, and may receive electrical power via a supplied AC power adaptor. The gateway 141 may have a power consumption of just over 1 watt and may be designed to conform to all governmental and other energy saving requirements of home and office equipment. Thus, in certain examples, by using a gateway device 141 a remote location (e.g., home) may be equipped for remote location monitoring, and may join a remote location monitoring network (e.g., weather station monitoring network) without needing a home computer. In other examples, terminals 151-161 including computing devices may be used to communicate remote location monitoring data to and from the server 101. Terminals 151 and 161 may be personal computers or servers that include many or all of the elements described above relative to the server 101.

As described below, in certain embodiments a gateway 141 or other terminal 151-161 communicates wirelessly with at least one indoor sensor 200 (e.g., relating to home monitoring) or outdoor sensor 200 (e.g., relating to weather monitoring), and one or more receiver devices 300 to display data and/or control integrated appliances. The gateway 141 or terminal 151-161 may receive information from a network router that is connected via high-speed Internet to the Weather Direct servers which is connected to one or more Internet sites including a centralized server (see, e.g., www.LaCrossetechnology.com, www.MyDataDirect.com, or www.weatherdirect.com) to transmit weather forecast data, traffic, music/sounds, news information, and any similar information to the receiver 300. The sensors 200, which may comprise of at least a temperature, humidity, and/or wind sensor, may also communicate to the receiver 300 the ambient conditions outside the user's home.

The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are exemplary and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the server 101 according to an illustrative embodiment of the invention may include computer executable instructions for invoking user functionality related to communication, such as email, short message service (SMS), and voice input and speech recognition applications.

In certain examples, the server 101 may communicate with one or more sensor devices 200 at remote locations (e.g., homes, businesses), for example devices including a series of sensors disposed external to the home for monitoring weather conditions. An illustrative example of an integrated sensor device 200 (e.g., detector) is shown in FIG. 2. Sensor 200 may be disposed external to a home, and may include one or more different sensing devices 202, such as humidity sensors, wind speed detectors, wind director detectors, static charge sensors, pressure detectors, visible light detectors, rain gages/detectors, pollen sensors, temperature gages, and other weather sensors. In other examples, the sensor 200 may be operative indoors at a remote location (e.g., home, business) and may relate to home monitoring. For example, as described in detail below, sensor 200 may comprise an audible detector 202 for smoke detectors, fire alarms, and/or burglar alarms. In other examples, the sensor 200 may comprise various other home monitoring sensors 202, such as a motion detector, power consumption monitor, standing water monitor, and/or other home monitoring detection devices described herein.

The sensor device 200 may include a processor 204 to evaluate signals and detection readings and/or a transmitter 206 to communicate its sensor readings to a computer or gateway device installed at the remote location. In certain examples, the sensor 200 may be removably attached to a computer 161 or gateway device 141, and may be physically connected to the computer 161 and/or gateway 141 (e.g., via a LAN network cable), or may be wirelessly connected (e.g., via radio network, Bluetooth, or other wireless network).

Sensor devices 200 may also be inter-connected to one or more receivers 300 (described below in reference to FIG. 3) to allow users to locally view the sensor readings and configure the sensors 200. For example, sensor devices may be disposed external to a home, but may transmit data to the server 101 via gateway 141, and may also transmit data locally to one or more receiver devices 300 inside the home. For instance, an integrated sensor device 200 disposed external to the home may include various sensing devices such as humidity sensors, wind speed detectors, static charge sensors, pressure detectors, visible light detectors, rain detectors, temperature gauges, and other local weather sensing components. The sensor device 200 may also be removably attached to the receiver system 300 by the means of a snap member 330, wired to a receiver 300 (e.g., through the power system) and/or wirelessly connected, to allow a user at a receiver 300 to view readings from the sensor 200 and/or to configure the sensor 200 (e.g., power on or off, adjust sensor reading timing and schedules, set sensor detection thresholds, etc.). As described below, when local configuration of sensors 200 and viewing of sensor data is not available using local receivers 300 (e.g., when a user is away from home), the server 101 may support additional techniques to provide sensor data to users and allow users to configured sensors and receivers with integrated appliances in the system.

Referring to FIGS. 3a-3c, illustrative embodiments of a receiver 300 are shown. Briefly, receiver 300 is a device configured to communicate with gateway 141 or other device, (e.g., terminals 151-161) for transmitting and/or receiving data from the server 101 or other remote network location. In addition to receiving information from the server 101 via gateway 141, receiver devices 300 may also have the ability to receive information from a multitude of information sources. For example, receiver devices 300 may also receive information regarding weather and other events via GPS, cellular towers, the Internet, and/or NOAA transmissions. For instance, a NOAA transmitter network utilizes about 900 transmitters, each having a roughly a forty mile radius, covering the entire United States. Although these transmitters currently do not provide sufficient specificity for many practical applications, embodiments of the present invention may include encoding the data from these transmitters to transmit specific location information along with alerts to users within specific geographic regions such as certain zip codes or zip plus four codes. As another example, when a receiver 300 is located in a mobile environment, e.g., when traveling down a road and/or in a train, the receiver's transceiver may come in contact with different cell towers. The receiver 300 may detect when it has left its home area and may display alternate information (e.g., weather displays for the new locality). In certain embodiments, a receiver 300 may be programmed to display weather data and/or other information most appropriate for its current position. For example, if the receiver 300 has just entered a new cell location, it may select the weather for the area between its home location and the new cell location. In other embodiments, it may select an average weather for the entire cell location.

Returning to the illustrative receivers 300 of FIGS. 3a-3c. In this example, receiver 300 includes various user inputs and a display screen 332 which may be a touch screen. The receiver may be continuously powered or may be turned on by depression of a power button 322. The receiver may include a LED power indicator 324 and/or simply use the screen backlighting as the power indicator. The receiver 300 may be variously configured to include weather button 301, buttons 319 and 320 to select weather data in Fahrenheit and Celsius, respectively, emergency light(s) 323, speaker button 313, microphone button 314, video button 315, reset button 316, and volume button 325, and/or other suitable interface buttons. Various ports may be included to include additional modules such as GPS modules and/or other communication and/or sensor devices The receiver 300 may be implemented in a standalone configuration and/or coupled to one or more other receivers 300. The receiver 300 may alternatively be configured as low cost display station with the minimum components for receiving and displaying information to a user. Alternatively, the receiver 300 may be a weather station, wall clock with and/or without localized information such as weather and/or traffic information, bedside alarms with localized information such as weather and/or traffic information, and/or temperature display with and/or without local wireless connected sensors.

In addition to the current system, a GPS module may be included in the receiver 300. The GPS receiver may be permanently and/or detachably mounted to the receiver 300. Where the receiver 300 including a GPS module is a weather station, the device may automatically extract weather data based on the coordinates of the GPS system. These coordinates may come from the GPS module or may be input by the user manually. When the coordinates are derived from the GPS module, the weather station receiver 300 may translate the GPS coordinates to zip codes and/or zip plus four codes to extract the correct weather related data. Alternatively, the weather data may be sent coded for GPS coordinates and the zip codes entered by the user may be translated to select the corresponding GPS coordinates. In other embodiments, the GPS module may be located in a hand held unit by the user and/or in an external unit which is connected either wired or wirelessly to the weather station or weather receiver.

In certain embodiments, weather data and other information may be transmitted from a satellite to the receiver 300. The receiver 300 may use the same antenna as the GPS unit and/or alternatively may use another antenna such as a satellite radio antenna. Where weather data is transmitted using a data feed of a satellite radio, it is preferred that the weather data be encoded with geographic data such as zip code and/or zip plus four code as discussed above. In embodiments where the GPS antenna or satellite antenna is utilized, the antenna may be utilized in a similar fashion as is currently employed for transmission of conventional data. In this manner, weather data may be provided to any location in the world by virtue of an up link to a satellite, down link to through the GPS/satellite radio interface. Similarly, customized weather data may be provided via DVB broadcast to local receivers. The local receivers may input zip codes and/or zip plus four codes and utilize these codes to filter incoming weather data. Accordingly, satellite receivers may contain one or more virtual channels depicting current weather conditions for any number of user selectable zip codes based on set-up data entered by the user at the time the satellite system is configured and/or installed in the user's home.

Additionally, both sensor devices 200 and receiving devices 300, may for example, be variously configured and integrated into cell phones, GPS receivers, alarm clocks, clock radios, wall clocks, PDAs (personal digital assistants), walkmans, digital cameras, dictaphones, cars, airplane seats, iPods and other similar such devices. For devices that do not require the use of a computer for setup, adjustments and inputs can be made by remote control, manual inputs, configured using USB connections, or other type data inputting system. The interface circuitry for each of the sensor and receiver devices in a home network may include a router and/or be coupled to a home gateway 141, hotspot router, or other terminal device. Where the circuitry is coupled to a gateway wirelessly, it may be coupled using 802.11 a-g, n, and/or a lower power interface circuitry such as 915 MHz ISM band transceiver. In either event, sensors 200 and/or receiver 300 may include an Ethernet controller, Wi-Fi receiver, or Bluetooth technology.

As illustrated in FIG. 4, receivers may be included in a variety of devices and appliances. Referring to FIG. 4, the home, business, or other enterprise 400 may include one or more transceivers 401. In a typical installation, only a single transceiver 401 is utilized for proper reception. In other embodiments where the home is extremely large or has concrete infrastructure, more than one transceiver 401 may be helpful. Other receivers in the home such as a PDA 423, appliances integrated with receivers such as microwave 406, coffee maker 405, refrigerator 404, and/or other devices integrated with receivers such as alarm clock 422, lamp 406, alarm 408, wall clock 416, care information center 417, outdoor sensor(s) 200, washer/dryer 410, water heater 411, bathroom heater (not shown), picture display 415, TV set 414, IR blaster (e.g., a remote) 421, thermostat 413, and/or clock radio 420 need only have a short range, low power, receiver for receiving data. In this embodiment, a single receiver 300 with a transceiver device 401 may be utilized to distribute data to every device in the home 400 in a very low cost information distribution network.

Certain items in the house 400 may also be interconnected using transceivers. For example, the home security alarm and/or the bed side alarm may be interconnected. In this manner, the home alarm may be deactivated 30 minutes after the user awakes so that it is not triggered by the user venturing outside to read his morning paper. Further, a user who set an alarm to wake up at 6 a.m. is also able to have the alarm communicate with other devices in the house. For example, the user may selectively turn down the heat at night by 10 degrees and turn the water heater down by 15 degrees and shut down the lights and other suitable energy saving mechanisms. In a similar fashion for a period of either 20 minutes, 30 minutes or other user selectable time prior to the selected alarm time, the alarm clock and/or transceiver 401 may signal other apparatus in the house to, for example, turn on the coffee maker 405, turn up the heat in the water heater 411, turn on a bathroom heater, turn up the temperature in the house, and set other functions responsive to the time the alarm is set to go off.

Having described various devices and components of certain illustrative systems, FIGS. 5 and 6 relate to methods and other techniques for performing remote location monitoring. Referring now to FIG. 5, a flow diagram is shown describing illustrative steps for providing an alarm indication based on a detection of an alarm or other audible signal at a remote location.

In step 501, an audible signal is detected at a detection device 200 (e.g., an audio sensing device) at a location such as a house or business. In this example, a sensor 200 may be configured to record and evaluated each audible sound in its vicinity over a predetermined decibel level. Thus, if the sensor 200 is operative at a residential location, it may be exposed to sounds such as voices, doorbells, ringing phones, barking dogs, and noises from televisions, stereos, and other appliances.

In step 502, the audible (analog) signal is converted into a digital signal within the sensor 200, and in step 503 the digital signal is compared to one or more previously stored digital signals corresponding to alarm signals that may sound near the sensor 200. For example, the sensor 200 may be preprogrammed with one or more distinct digital audio patterns corresponding to alarms from a smoke detector, fire alarm, burglar alarm, and other alarm systems active at the location of the sensor 200. For instance, the sensor 200 may automatically recognize (e.g., by frequency, pitch, volume, etc.) an alarm sound from a standard smoke detector and thus need not be especially programmed by a homeowner or other user in order to identify an alarm signal. In other examples, a sensor 200 may be programmed by a homeowner or other user to 'learn' and respond to specific sounds within range of the sensor 200. For instance, if a monitored home has burglar alarm with a unique (or customized) sound, a programmable sensor 200 may be used to record and store the alarm sound during an initialization process so that the sound can be recognized during subsequent comparisons in step 503. Additionally, although this example describes standard and customized alarm signals that are stored at the sensor 200, it should be understood that the standard and/or customized digital alarm patterns may be stored outside of the sensor 200 in other examples. For instance, a standard library of digital alarm patterns may be stored within the gateway 141 or terminal 151-161 at the same location, or remotely at the central server 101.

If the audio signal detected by the sensor 200 corresponds to an alarm signal (e.g., smoke detector, fire alarm, burglar alarm) (step 503: Yes), then in step 504 an alarm indication is transmitted from the sensor 200 via a computer network to the gateway 141 and/or additional network and system components. As described above, the sensor 200 may transmit alarm indications via gateway 141 (or other terminal 151-161) to a system server 101. In this example, the server 101 may be responsible for transmitting notifications to users and/or updating resources (e.g., event maps, system logs, status web pages), as described below in reference to FIG. 6. In other examples, a terminal (e.g., 151-161) at the location of the sensor 200 may alternatively perform these functions.

In this example, if the audio signal detected by the sensor 200 does not correspond to an alarm signal (step 503: No), then the sensor 200 will not transmit an alarm indication to the gateway 141 (step 505). Thus, if the sound detected in step 501 was not an alarm (e.g., ringing phone, barking dog, television), then the sensor 200 would not transmit an alarm indication. Of course, in other examples, the sensor 200 may be configured to provide indications based on other sounds besides alarms. For instance, the same sensor 200 or a different audio sensor 200 may be programmed with a home doorbell audio pattern, and may transmit a doorbell indication upon detection of the doorbell sound.

Although FIG. 5 relates to sound detection of an audible alarm signal, it should be understood that other examples may be implemented based on the functionalities of various other types of sensors 200. For example, a water detector 200 on the basement floor at a house may be used to provide notifications to a homeowner whenever the basement floods, using similar steps to those described in FIG. 5 to provide the notifications. As another example, a power consumption monitor 200 may be used to provide notifications to users when a home appliance or computing device is malfunctioning. Additional examples may relate to notifications based on detected weather conditions. For example, a user may register to receive notifications based on one or more weather conditions detected by an external weather sensor 200 at their residence or other location. For instance, users may receive external temperature notifications (e.g., temperature reading above or below a threshold value), wind notifications (e.g., wind gust above a threshold value), and other notifications based humidity, pressure, daylight, precipitation, and other weather conditions.

Referring to FIG. 6, a second flow diagram is shown describing illustrative steps for notifying one or more users based on an alarm indication or other detection reading from a sensor 200. In step 601, a detection reading is received from one or more sensors 200 via a computer network at a computing device. In certain examples, the steps of FIG. 6 may be performed by the server 101, or other computing device that receives data from one or more sensors 200 (e.g., gateway 141, terminals 151-161). As described above, a central server 101 may be configured to receive detection readings from a plurality of sensors 200 operative at a plurality of different remote locations (e.g., via gateways 141 at different residential or business locations).

In step 602, the server 101 identifies the detection reading and determines a detector type and/or data type for the reading. For example, the received data may correspond to a temperature reading from an external weather sensor 200 at a residential location. In this example, data transmission from the gateway 141 may include sender and/or header information allowing the server 101 to identify the gateway 141, the sensor 200, and the type of data being transmitted.

In step 603, the server 101 may retrieve a set of detection parameters based on the location, detector type and/or data type information identified in step 602, and in step 604 a determination is made whether or not to notify users of the received detection reading. As an example, a user may register to receive a notification every time a temperature reading below freezing is recorded at an external temperature sensor 200 outside the user's home. In this example, the notification parameters may comprise a user identifier, a sensor identifier, and a temperature range (e.g., <32° F.), and the parameters may be stored at the server 101 to be retrieved whenever a new temperature reading is received from the user's external weather sensor. As another example, a user may register to receive a notification every time a new temperature reading is received from the user's external sensor 200, regardless of the temperature of the readings. Thus, less parameters (or even no parameters) might be stored at server 101 in certain notification examples (e.g., requesting a notification every reading, every other reading, every 5 minutes, etc. from a designated sensor 200).

Although the above examples relate to notifications based on temperature readings at an external weather sensor 200, it should be understood that notifications may be based on other types of sensors 200 (e.g., wind, light, pressure, humidity, precipitation, audio, motion, alarm, power consumption, and other home monitoring and/or weather sensors). It should also be understood that the numbers, types, and values of the parameters stored at server 101 for the different sensors 200 may depend on the type of sensor 200 and the sensor data being received. For instance, a server 101 may be configured to notify a homeowner every time an audio alarm sensor (e.g., a smoke detector as discussed above in FIG. 5) transmits an alarm indication. However, the homeowner might only request power consumption notifications when several consecutive power consumption readings for an appliance with an integrated receiver 300 indicate that the appliance is malfunctioning. Additionally, as described below in reference to step 605, the notification parameters retrieved in step 603 may relate to the type of notification the user has requested (e.g., call, email, page, text message) may include one or more notification recipient addresses.

In step 604, the server 101 compares the previously stored notifications parameters to the received data to determine if a notification should be sent. Thus, in the example mentioned above, if the user has registered for below freezing weather updates and a temperature reading of 38° F. is received from the user's external weather sensor 200 (604: No), then a notification should not be provided based on that reading. However, if a subsequent reading of 30° F. is received from the user's external weather sensor 200 (604: Yes), then a notification should be provided in accordance with the user's notification registration in step 605.

In step 605, one or more notifications are provided in accordance with the user's notification registrations. As discussed above, in certain examples, users may register to receive a combination of the telephone call notifications, email notifications, pager notifications, text message notifications, and/or instant message notifications based on detection readings received from sensors 200 associated with the user's accounts. For example, a user may register to receive an email notification every time an external wind sensor 200 at the user's house reports a wind gust of greater than 20 MPH. However, the same user may register to receive a work phone call, a phone call to a secondary phone (e.g., a spouses phone), a text message to a mobile phone, and email notifications whenever an alarm signal is indicated at the user's home from an alarm sensor 200 (e.g., a smoke detector detector), or a possible intrusion is indicated by a motion sensor 200. Notifications may also be based on combinations of readings from one or more sensors 200 (e.g., notifications for wind gusts sustained over a specified amount of time, notifications for wind gusts with concurrent rain readings, notifications for cold temperatures with concurrent power failure readings at a water heater or other appliance). Additionally, users may be permitted to register for notifications based on the sensor readings of other users' sensors, for example, sensors installed by friends, family members, neighbors, or from community sensors which provide public readings available to all system users with access to the server 101. For example, a user might register for email notifications whenever the temperature at the user's parent's house is greater than a temperature threshold (e.g., <95° F.). As another example, the user may request weather alerts for severe weather (or normal weather) anywhere within the user's vicinity (neighborhood, zip code, distance radius, etc.).

In addition to notifications sent directly to users, notifications can take the form of updates to a resource accessible to one or more users. For example, in addition to (or instead of) direct weather notifications, a user may register to be part of a weather community in which readings from the user's weather sensor 200 are added to a publicly available web site, such as community weather map or weather event chart.

In the example of FIGS. 7-9, a web page provided by server 101 of the weather system displays a view of a residential area near Denver, Colo. In this example, weather system users in this region may register to join their local weather community. For users that join the weather community, data from their external weather sensors 200 may automatically be integrated into a community web page 700 which is accessible to other users in the community. The community web page 700 may comprise a weather map and/or weather event table including real time updates of the weather in the region. In this example, after a user accesses the web site and selects the displayed region 700, a data summary box 710 will appear in one corner of the map to show a compilation of subscriber and weather data for the visible area. As shown in FIG. 7, the system may automatically display the total number of weather system subscribers and active (online) weather display devices in the selected region, along with the average temperature, humidity, wind, and/or other summary weather data. The data may be calculated automatically at the central server 101 using all of the active weather stations in the selected region. The weather system may also leverage the different features of the underlying mapping software (e.g., Google Maps®, Microsoft Virtual Earth®). Thus, in this example, the user may be able to zoom-in or zoom-out, causing the data summary box 710 to automatically refresh the displayed data to match the updated geographic region displayed on the screen. Similarly, the map feature may permit online users to change to a zip code view, city view, county view, etc., or any other view configuration supported by the underlying mapping software. Additionally, weather data (e.g., satellite data) may be received by the server and superimposed over the map requested by the user.

Referring now to FIG. 8, the subscriber has used the map feature to zoom into a smaller geographic region, causing an automatic update in the summary and compilation data shown in box 810. Additionally, in this example, the weather system central server has made a determination that the selected region is small enough to display an icon and number for each subscriber in the area. In FIG. 9, the user has activated a subscriber information window 910 by selected (e.g., clicking) on the individual subscriber icon/number "4" from FIG. 8. In this example, the subscriber information window contains the subscriber name, device data and weather data received from the subscriber's device, along with several links to allow the user to communicate with the selected subscriber and/or the subscriber's devices (e.g., view stations, configure stations, email, or send an instant message). Thus, if the clicks on the "Email" or "Chat" links, the weather system may initiate an email or instant messenger application with the selected subscriber's information to allow the user to communicate with that subscriber. In certain examples users may have the option to disable their own "Email" and/or "Chat" links so that their personal information (e.g., email address or instant messaging identifier) is not accessible to other subscribers. Additionally, in this example, after selecting the "View Stations" link to see, the user may be presented a home device map similar to the illustrative screen shown in FIG. 4. This link may also be used to retrieve data from any accessible weather display device (i.e., devices not permissioned by the owner subscriber as hidden, or marked as private, etc.), or to configure/reprogram data one of the weather display devices (similarly, owners subscribers may set permission on all or some of their devices to allow/disallow remote configuration by third-parties).

According to additional aspects, sensors 200 and/or receivers 300 at a remote location may be controlled by commands from the server 101, based on user interaction with the server user interface (e.g., a web site or other server application). For example, as discussed above, the server 101 may provide a user interface to allow users to register (e.g., add or remove) sensors 200, view sensor readings and status, and to register for notifications by selecting one or more sensors 200 and designating the desired notification parameters. Using a similar system and set of components, users may interact with a server 101 user interface (e.g., web site) to configure sensors 200, appliances with integrated receivers 300, and other devices connected to the user's gateway 141 (or terminal 151, 161, etc.). Thus, in addition to basic home monitoring functions, remote device/appliance control at a user's home or other remote location may be supported using a similar monitoring infrastructure. As an example, a receiver unit 300 may be integrated into a home automation system so that the unit would, for example, close windows when rain is detected by the external rain sensor 200, or when the receiver 300 receives an indication from the server 101 that there is a high probability of rain at the user's home location.

Certain examples provide for determining the geographic location of a device (e.g., gateway 141 or terminal 161) using an IP address reverse lookup table or similar reverse geographic location technology either implemented locally at the server 101 or at the remote location of the device to determine the geographic location of the device and using this information cross to correctly displayed sensor information received from the device on a map 900 or other user interface.

As mentioned above, according to certain aspects, users may control remotely sensors 200, receivers 300, and other receiver-integrated appliances connected via gateway 141 or other system components in a home monitoring system. For example, the server 101 may provide a user interface (e.g., web page) to allow authenticated users to remotely configure sensors 200 and control connected devices and other appliances via the Internet. Additionally, users may configure the server 101 to control sensors 200 and devices/appliances with receivers 300 automatically to take certain actions based on home monitoring alerts, weather conditions, and other information available to the server 101. For example, if the server 101 was alerted to a child abduction (e.g., Amber alert) or a criminal escape in the vicinity of a user's home (e.g., via a news notification service), the server 101 may be configured to automatically close and lock the doors in the home, close the windows and/or turn on an alarm system. As another example, in response to a tornado warning alert, the server 101 may be programmed to automatically close storm shutters for all homes in the area of the alert. In other examples, a home monitoring system may have motion detectors and sound detection sensors 200 that would alert the central server 101 to potential intrusions. In this example, after receiving a notification of a potential intrusion (wherein the sending of the notification was based on the user preferences and configuration of the server 101), the user may then be able to login to the server 101 to view additional information regarding the potential intrusion (e.g., an image taken from a motion activated camera 200, or a sound recorded by an audio sensor 200). Based on this information, the user may activate remotely certain devices within the home (e.g., door locks, windows, safes, other appliances) and/or may notify law enforcement or family members. Thus, in certain examples, the user interface of the server 101 may support functionality for users to directly control sensors 200 and/or appliances and device integrated with receivers 300 remotely (e.g., engaging door and window locks, turning appliances and alarm systems on and off, etc.) within the user's home or business location. In other examples, the server 101 may be programmed to automatically take actions even without the explicit directions of a user. For example, upon identifying a potential intrusion at the house via a motion detector 200, the server 101 may transmit an instruction via gateway 141 to automatically close and lock the doors and windows in the house. The server 101 may then notify the user of the potential intrusion and/or may alert law enforcement through an E911 system or PSTN system.

Referring now to FIG. 10, an illustrative screen shot is shown allowing an authenticated user to configure various sensors 200 and receiver appliance devices 300 at a remote location to be automatically controlled by the server 101. In this example, the devices 200-300 at the remote location may be controlled using an Internet Protocol (IP) via gateway 141. Therefore, the interface may be customized such that different manufacturers may design to the protocol. For example, by using plug and play techniques, simply installing a new appliance (e.g., a furnace, an alarm clock, a new car, a new refrigerator, a new television, a new phone), the device connects with, for example, gateway 141 and/or terminals 151-161, determines the home to which they were installed, and registers with the users home automation control panel, e.g., www.mydatadirect.com or www.WeatherDirect.com. The goal of the unified interface for different appliances is to have a single unified standard to simplify interconnectivity for the user. Where the different consumer electronics suppliers standardize on a single interface (e.g., 802.11a-g, n) and a single protocol, e.g., PCMIA plug and play like protocol, then the consumer experience is substantially enhanced. Further, one manufacturer can sell many additional products to the same family over time by staging the cost of the acquisition. For example, the children can purchase their parents an alarm clock one holiday, an outdoor sensor kit another holiday, a web cam for the grandchild's outdoor play area another holiday, etc.

Referring now to FIG. 11, the setup and configuration data is downloaded from the device connected to the user's network. In this example, the device being configured may be an external temperature sensor 200 for detecting and providing temperature data to the server 101. The temperature sensor 200 in this example may be configured to communicate wirelessly with the gateway device 141. In certain examples, a temperature sensor 200 may have a wireless range of approximately 300 feet. The temperature sensor may also be battery powered, avoiding the need to position the sensor next to an electrical outlet. In addition to the temperature data, the sensor 200 may also be configured to monitor and transmit humidity data. The sensor 200 in this embodiment may include an extendable probe (e.g., 6 feet in length) that can detect and communicate an additional temperature and/or humidity reading, for example, from a swimming pool or spa, refrigerator, freezer, etc. Although the sensor 200 may be configured to detect and transmit temperature and other data immediately (i.e., in real time), it may also be configured to store history data for a period of time (e.g., days, weeks, or months) and transmit the stored data upon request, for example, as a spreadsheet file compatible with Microsoft EXCEL® and/or other third-party software applications.

Referring now to FIG. 12, an additional display is shown of an illustrative user interface provided by the server 101. In this example, the user may configure his/her information screen to monitor various data from his/her network of devices. For example, at a glance, the user may monitor a webcam and other data from his/her summer house such as inside/outside temperature, alarm status, furnace status, etc. The additional information may be variously configured to only appear once the picture is clicked on by the user, where the user hovers over the picture with the mouse, and/or overlaid over the location information supplied by the webcam. Similarly, the view from the user's dock may be displayed with tide, wind speed and direction, as well as outside temperature. Further thumbnails may be displayed including such webcams as the local airports (e.g., LaGuardia and Newark), traffic cams from the drive home, the user's living room, baby's room, and/or day care center, the alarm status of the home including a map of the various rooms and associated alarm status and diagnostics.

Still referring to FIG. 12, the system may further be configured to download and/or upload information from various devices and include virtual images of the controls of those devices on a connected web page. For example, a user wishing to set his alarm clock to get up early for an important meeting may do so from work. By accessing the web page (e.g., www.mydatadirect.com) the user may be presented with a virtual image of the alarm clock sitting next to his/her bed. The user may click on various buttons and set the alarm for every day, and/or for only a certain day. The control command is then sent to the device using a suitable protocol, e.g., IP. The alarm clock may then respond with a message (e.g., via e-mail, SMS, chat, or to the web page www.mydatadirect.com) confirming that it has received the new settings and will adjust its settings accordingly. The alarm clock may be further programmed to notify other users (e.g., the husband and wife) where the alarm clock serves the needs of more than one person. In this manner, the spouse is notified when the alarm clock is changed. For example, the alarm clock may have multiple alarms one controlled by each spouse. Alarms may also be password protected, for example, so that one spouse cannot change the settings of the other spouse without having the password. In other examples, the alarms of children cannot be turned off and/or altered without the password.

Referring now to FIG. 13, another example of home appliance control is shown in accordance with aspects of the disclosure. In this example, a receiver 300 may be integrated into and may control, via a separate wireless module 1304, a lawn sprinkler 1300 so that the sprinklers 1300 is turned on and off in accordance to the commands of the server 101 (via the gateway 141 or other terminal). Thus, as discussed above, a user may be able to remotely operate the sprinkler 1300 by logging into the server 101, and the server 101 may be configured to automatically operate the sprinkler 1300 in response to certain conditions (e.g., sensor readings, news alerts). The separate wireless module 1304 may include a battery operated valve that would control when the sprinkler 1300 is allowed to operate. In this example, a home owner may be able to control their lawn sprinkler 1300 remotely via the web site of the server 101. For instance, a user away from home on a vacation may log into the server 101 to turn off the sprinkler 1300 if the user discovers that it has recently rained at the user's house. As another example, the server 101 may be configured, using a similar technique to the notification process, to turn off the sprinkler 1300 automatically (i.e., without explicit user instructions) when an external rain sensor 200 at the user's house indicates that it has recently rained a sufficient amount to water the lawn. In a similar example, rather than turning the sprinkler 1300 off entirely, the server 101 may be configured to increase or decrease the watering time for the sprinkler 1300 based on the recent precipitation measures at a sensor 200 or received from a weather source via the server 101.

As an alternative to a separate rain sensor 200, the sprinkler 1300 may include its own rain gauge and be configured to be powered via a turbine and energy store included within the sprinkler module 1304 so that the power would be generated based on the water flow through the turbine. This power would then be stored in a capacitor and used to open or close a valve to either turn off or turn on the water flow. The water flow would be turned off or turn on based on information about the weather received by the server 101. For example, if it was determined that there was a high probability of rain within the next eight hours, the sprinkler 1300 would not be turned on at that time.

As another example, a power consumption sensor 200 may be installed between an appliance and the wall socket. This will enable a user to monitor and view the energy requirements for all electrical appliances in his/her home. This data can be uploaded to the user's information website (e.g., www.WeatherDirect.com) to track, monitor, or adjust the settings of the respective appliances.

Referring now to FIG. 14, an example of a smoke detector detector device 1400 is shown. As discussed above in reference to FIG. 5, smoke detector detector 1400 may be configurable to provide an alarm indication based on a detection of an audible alarm at a remote location. The device 1400 in this example may be configured to respond to smoke detectors, fire alarms, burglar alarms, and/or may be programmable/configurable so that it can respond to custom alarm sounds or other noises occurring at the remote location.

In yet another example, based on the weather forecast received at the server 101, a heater may be turned on when there is a high probability that the low temperature would exceed a user's particular threshold so that the heater is efficiently controlled. For example, when it is warmer outside in the situation of a heat pump, so that the house could be warmed up prior to the temperature dropping. By integrating weather prediction capabilities into a furnace's control system, it may be possible to increase the SEER rating of the furnace beyond the levels achieved today.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention. The description is thus to be regarded as illustrative instead of restrictive on the present invention.

The invention claimed is:

1. A server, comprising:
a processor controlling at least some operations of the server; and
memory storing computer executable instructions that, when executed by the processor, cause the server to:
receive detection data via a computer network, the received detection data corresponding to a detection reading from a detector device at a remote location;
identify at least one of a detector type or a data type associated with the received detection data;
retrieve one or more detection parameters associated with the identified detector type or data type and associated with the remote location;
compare the detection data to the retrieved detection parameters;
determine, based on the comparison, whether or not one or more registered users associated with the remote location should be notified;
in response to determining that one or more registered users associated with the remote location should be notified, identify one or more notification addresses of one or more registered users associated with the remote location; and
transmit a notification to each of the one or more notification addresses, said notifications indicating the detection reading from the detector device at the remote location.

2. The server of claim 1, wherein at least one of the notification addresses comprises a source web page stored at the server and said transmitting comprises updating the source web page to reflect the detection reading from the detector device at the remote location.

3. The server of claim 2, wherein the source web page comprises a user interface displaying detection readings from each of a plurality of remote locations.

4. The server of claim 1, wherein the received detection data corresponds to weather data from a weather detector at the remote location, and wherein the server is configured to receive weather data from a plurality of weather detection devices at a plurality of geographically separate remote locations.

5. The server of claim 1, wherein the one or more notification addresses comprises at least one of a phone number, a pager number, an email address, and an instant messaging address, and wherein said transmitting comprises initiating at least one of a telephone call, a page, a text message, an email, and an instant message.

6. The server of claim 5, wherein the server is configured to transmit a combination of notifications to a first registered user in response to the received detection data, the combination of notifications comprising two or more of: a telephone call notification, an email notification, a pager notification, a text message notification, and an instant message notification.

7. The server of claim 1, wherein the received detection data comprises at least one of temperature data from a temperature sensor, wind data from a wind sensor, humidity data from a humidity sensor, rain data from a rain sensor, motion data from a motion detector, electricity consumption data from a power sensor, and alarm data from an alarm detector.

8. The server of claim 1, wherein the received detection data comprises data from an audio detector indicating that sounds from at least one of a smoke detector, fire alarm, or burglar alarm were detected at the remote location.

9. The server of claim 1, the memory storing further computer executable instructions that, when executed by the processor, cause the server to:
start a timer corresponding to the receipt of the detection data;
identify a time duration associated with the detector device corresponding to the detection data;
determine that the timer has reached the time duration associated with the detector device without receiving additional detection data corresponding to the detector device; and
transmit a notification to one or more notification addresses, said notification indicating that the detector device at the remote location has failed to report data in the time duration.

10. The server of claim 1, wherein the determination whether or not one or more registered users associated with the remote location should be notified is based on a combination of:
a first comparison between first detection data from a first detector type and a first set of retrieved detection parameters associated with the first detector type; and
a second comparison between second detection data from a second detector type and a second set of retrieved detection parameters associated with the first detector type.

11. A method, comprising:
receiving, by a detection data processing device, detection data from a detector device at a remote location;
identifying, by the detection data processing device, at least one of a detector type or a data type associated with the received detection data;
retrieving, by the detection data processing device, one or more detection parameters associated with the identified detector type or data type and associated with the remote location;
comparing, by the detection data processing device, the detection data to the retrieved detection parameters;
determining by the detection data processing device, whether or not one or more registered users associated with the remote location should be notified based on the comparison;
in response to determining that one or more registered users associated with the remote location should be notified, identifying by the detection data processing device one or more notification addresses of one or more registered users associated with the remote location; and
transmitting, by the detection data processing device, a notification to each of the one or more notification addresses, said notifications including the detection data received from the detector device at the remote location.

12. The method of claim 11, wherein at least one of the notification addresses comprises a source web page stored at the detection data processing device and said transmitting comprises updating the source web page to reflect the detection data received from the detector device at the remote location.

13. The method of claim 12, wherein the source web page comprises a user interface displaying detection data received from a plurality of detector devices at a plurality of remote locations.

14. The method of claim 11, wherein the received detection data corresponds to weather data from a weather detector at the remote location, and wherein the method further comprises receiving weather data from a plurality of weather detection devices at a plurality of geographically separate remote locations.

15. The method of claim 11, wherein the one or more notification addresses comprises at least one of a phone number, a pager number, an email address, and an instant messaging address, and wherein said transmitting comprises initiating at least one of a telephone call, a page, a text message, an email, and an instant message.

16. The method of claim 15, wherein said transmitting comprises transmitting a combination of notifications to a first registered user in response to the received detection data, the combination of notifications comprising two or more of: a telephone call notification, an email notification, a pager notification, a text message notification, and an instant message notification.

17. The method of claim 11, wherein the received detection data comprises at least one of temperature data from a temperature sensor, wind data from a wind sensor, humidity data from a humidity sensor, rain data from a rain sensor, motion data from a motion detector, electricity consumption data from a power sensor, and alarm data from an alarm detector.

18. The method of claim 11, wherein the received detection data comprises data from an audio detector indicating that sounds from at least one of a smoke detector, fire alarm, or burglar alarm were detected at the remote location.

19. The method of claim 11, further comprising:
starting a timer corresponding to the receipt of the detection data;
identifying a time duration associated with the detector device corresponding to the detection data;
determining that the timer has reached the time duration associated with the detector device without receiving additional detection data corresponding to the detector device; and
transmitting a notification to one or more notification addresses, said notification indicating that the detector device at the remote location has failed to report data in the time duration.

20. The method of claim 11, wherein the determination whether or not one or more registered users associated with the remote location should be notified is based on a combination of:
a first comparison between first detection data from a first detector type and a first set of retrieved detection parameters associated with the first detector type; and
a second comparison between second detection data from a second detector type and a second set of retrieved detection parameters associated with the first detector type.

* * * * *